(12) United States Patent
Hidaka et al.

(10) Patent No.: US 6,477,030 B2
(45) Date of Patent: Nov. 5, 2002

(54) ELECTRONIC COMPONENT

(75) Inventors: Akio Hidaka, Miyazaki (JP); Katsumi Sasaki, Miyazaki (JP); Sumio Tate, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/797,856

(22) Filed: Mar. 5, 2001

(65) Prior Publication Data

US 2002/0080550 A1 Jun. 27, 2002

(30) Foreign Application Priority Data

Jul. 7, 2000 (JP) .......................... 2000-206482

(51) Int. Cl.[7] .................... H01G 4/00; H01G 4/228; H01G 2/20
(52) U.S. Cl. ................. 361/301.3; 361/306.3; 361/308.1; 361/311
(58) Field of Search ............ 361/301.1–301.4, 361/306.1–306.3, 307, 308.1–308.3, 309–313, 320, 321.1–321.5

(56) References Cited

U.S. PATENT DOCUMENTS

| | | | | |
|---|---|---|---|---|
| 4,617,609 A | * | 10/1986 | Utner et al. ................. 29/25.42 |
| 4,734,819 A | * | 3/1988 | Hernandez et al. ......... 174/52.4 |
| 4,748,537 A | * | 5/1988 | Hernandez et al. ......... 174/72 B |
| 4,959,505 A | * | 9/1990 | Ott .............................. 174/52.2 |
| 5,466,887 A | * | 11/1995 | Hasegawa .................... 174/52.2 |
| 5,712,758 A | * | 1/1998 | Amano et al. ................ 361/306.3 |
| 5,883,780 A | * | 3/1999 | Noji et al. ..................... 361/303 |
| 5,889,445 A | * | 3/1999 | Ritter et al. ................... 333/172 |

FOREIGN PATENT DOCUMENTS

| | | |
|---|---|---|
| JP | 5-4448 | 1/1993 |
| JP | 5-36559 | 2/1993 |
| JP | 7-66325 | 3/1995 |
| JP | 8-138968 | 5/1996 |
| JP | 2962895 | 8/1999 |

* cited by examiner

Primary Examiner—Anthony Dinkins
Assistant Examiner—Eric Thomas
(74) Attorney, Agent, or Firm—McDermott, Will & Emery

(57) ABSTRACT

The present invention aims at providing an electronic component that can be readily reduced in size. Further, even when the electronic component is reduced in size, the miniaturized electronic component has (i) a wide range in capacitance, (ii) is allowed to be produced easily, (iii) has excellent electrical characteristics and (iv) can prevent defects due to a poor connection between the electronic component and a circuit board caused by warpage of the circuit board and the like when the electronic component is connected to the circuit board. The electronic component includes a capacitor element with a pair of lead terminals and an exterior packaging material disposed so as to encapsulate the capacitor element. The maximum length of the exterior packaging material is 7.5 mm or less and the maximum length of the capacitor element is 5.5 mm or less. Capacitance C of the capacitor element satisfies an inequality of $4\,pF \leq C \leq 4700\,pF$ and a DC break down voltage BDV satisfies an inequality of $BDV \geq 4.5\,KV$. The smallest spacing between the pair of lead terminals ranges from 3.0 mm to 6.0 mm.

40 Claims, 5 Drawing Sheets

ELECTRONIC COMPONENT

TECHNICAL FIELD

The present invention relates to an electronic component used advantageously in electronic equipment such as a modem, power supply circuit, LCD power supply, DC—DC converter and the like.

BACKGROUND ART

FIG. 6 is a cross-sectional view of a prior art electronic component.

In FIG. 6, a first electrode 2 and a second electrode 3 are formed on both principal surfaces of a substrate 1, respectively. A first terminal 4 is connected to the first electrode 2 and a second terminal 5 is connected to the second electrode 3. An exterior packaging material 6 is formed by molding to encapsulate the substrate 1, first electrode 2, second electrode 3, first terminal 4 and second terminal 5.

The first terminal 4 and second terminal 5 are bent along the surface of the exterior packaging material 6, respectively, and extended to reach the same surface of the exterior packaging material 6 and disposed thereon. In other words, the respective ends of the first terminal 4 and second terminal 5 are situated on the same surface of the exterior packaging material 6. The electronic component thus prepared has been used as a surface mount component.

However, when it comes to miniaturization of such a prior art electronic component as above, a natural next step requires that the size and thickness of the substrate 1 are to be reduced, resulting in a mechanical weakness of the substrate 1, susceptible to breakage, or a reduction in the range of electric capacity that could have been realized otherwise. The prior art electronic component has been plagued with such problems as described in above.

SUMMARY OF THE INVENTION

An electronic component of the present invention comprises:
(a) a capacitor element,
  wherein the capacitor element has a pair of end terminations disposed on both ends thereof, and
  wherein the pair of end terminations are formed of a first end termination disposed on a first end out of both ends and a second terminal disposed on a second end out of both ends;
(b) a first lead terminal connected to the first end termination,
  wherein the first lead terminal has a first junction section where a connection is made with the first end termination;
(c) a second lead terminal connected to the second end termination,
  wherein the second lead terminal has a second junction section where a connection is made with the second end termination; and
(d) an exterior packaging material disposed in such a way as encapsulating the capacitor element, first end termination, second end termination, first junction section and second junction section.

The exterior packaging material is shaped like close to a rectangular prism and the capacitor element is also shaped like close to a rectangular prism.

The first lead terminal has a first mounting section exposed by extending from the exterior packaging material and the second lead terminal has a second mounting section exposed by extending from the exterior packaging material.

The exterior packaging material measures 7.5 mm or less in length at maximum and the capacitor element measures 5.5 mm or less in length at maximum.

Capacitance C of the capacitor element preferably falls in the range of "4 pF$\leq$C$\leq$4700 pF" and a DC breakdown voltage BDV of the capacitor element is 4.5 KV or higher, satisfying an inequality of "BDV$\geq$4.5 KV".

When the exterior packaging material measures M1 in length, M2 in height and M3 in width, the M1, M2 and M3 are to satisfy preferably the inequalities (1), (2) and (3) as defined below, respectively:

| | |
|---|---|
| 4.5 mm $\leq$ M1 $\leq$ 7.5 mm | (1) |
| 1.0 mm $\leq$ M2 $\leq$ 3.5 mm | (2) |
| 2.0 mm $\leq$ M3 $\leq$ 7.0 mm | (3) |

When the capacitor element measures L1 in length, L2 in height and L3 in width, the distance between the first end termination and the second end termination is L4 and the width of the first and second end terminations measured on the side surfaces of the capacitor element is L5, the L1, L2, L3, L4 and L5 are preferably to satisfy the inequalities (4), (5), (6), (7) and (8) as defined below, respectively:

| | |
|---|---|
| 3.0 mm $\leq$ L1 $\leq$ 5.5 mm | (4) |
| 0.5 mm $\leq$ L2 $\leq$ 2.5 mm | (5) |
| 1.5 mm $\leq$ L3 $\leq$ 3.5 mm | (6) |
| L4 $\leq$ 1.5 mm | (7) |
| L5 $\leq$ 0.5 mm | (8) |

Preferably, the minimum spacing between the first mounting section and the second mounting section ranges from 3.0 mm to 6.0 mm.

Preferably, the capacitor element is a stacked capacitor also referred to as a multi-layered capacitor.

Preferably, the first mounting section is formed by having the first lead terminal bent so as to become almost flush with the surface of the exterior packaging material and the second mounting section is formed by having the second lead terminal bent so as to become almost flush with the surface of the exterior packaging material.

The first and second mounting sections are bent in the same direction with each other and the respective tip ends of the first and second mounting sections extend as far as the same bottom surface of the exterior packaging material.

The maximum spacing between the first mounting section and the surface of the exterior packaging material and the maximum spacing between the second mounting section and the surface of the exterior packaging material measure 0.05 mm or more, respectively.

As a result, when the first mounting section and second mounting section are mounted onto a circuit board to be connected therewith, the first mounting section and second mounting section are allowed to have leeway for warpage, respectively, thereby contributing to the prevention of defects due to poor connections between the electronic component and the circuit board and the like when a mechanical stress caused by warpage and the like is applied to the circuit board after the electronic component is mounted on the circuit board for connection.

PREFERRED EMBODIMENTS OF THE INVENTION

Figure 1:
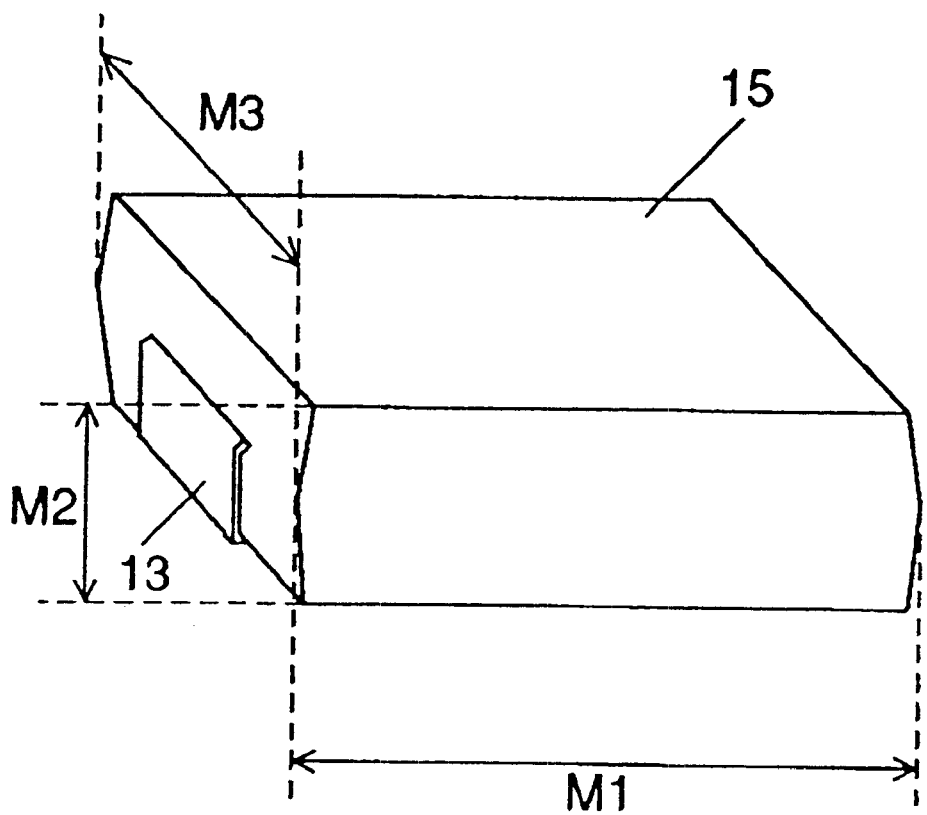
FIG. 1 is a perspective view of an electronic component in an exemplary embodiment of the present invention.

The present invention provides an electronic component that makes the miniaturization thereof possible. The miniaturized electronic component can realize at least one of such features as (i) a wide range in electric capacity, (ii) easiness in preparation, (iii) excellent electrical characteristics and (iv) the prevention of defects due to poor connections between electronic components and a circuit board and the like caused by warpage and the like of the circuit board at the time when the electronic components are connected to the circuit board.

An electronic component in an exemplary embodiment of the present invention comprises:

(a) a capacitor element,
  wherein the capacitor element is shaped like close to a rectangular prism,
  wherein the capacitor element has a pair of end terminations disposed on both ends thereof, and
  wherein the pair of end terminations are formed of a first end termination disposed on a first end out of both ends and a second termination disposed on a second end out of both ends;

(b) a first lead terminal connected to the first end termination,
  wherein the first lead terminal has a first junction section where a connection is made with the first end termination;

(c) a second lead terminal connected to the second end termination,
  wherein the second lead terminal has a second junction section where a connection is made with the second end termination;

(d) an exterior packaging material disposed in such a way as encapsulating the capacitor element, first end termination, second end termination, first junction section and second junction section,
  wherein the exterior packaging material is shaped like close to a rectangular prism.

The first lead terminal has a first mounting section that is exposed from the exterior packaging material and the second lead terminal has a second mounting section that is exposed from the exterior packaging material.

When the exterior packaging material measures M1 in length, M2 in height and M3 in width, the M1, M2 and M3 satisfy the inequalities (1), (2) and (3) as defined below, respectively:

| 4.5 mm ≤ M1 ≤ 7.5 mm | (1) |
| 1.0 mm ≤ M2 ≤ 3.5 mm | (2) |
| 2.0 mm ≤ M3 ≤ 7.0 mm | (3) |

When the capacitor element measures L1 in length, L2 in height and L3 in width, the distance between the first end termination and the second end termination is L4 and the width of the first and second end terminations measured on the side surfaces of the capacitor element is L5, the L1, L2, L3, L4 and L5 satisfy the inequalities (4), (5), (6), (7) and (8) as defined below, respectively:

| 3.0 mm ≤ L1 ≤ 5.5 mm | (4) |
| 0.5 mm ≤ L2 ≤ 2.5 mm | (5) |
| 1.5 mm ≤ L3 ≤ 3.5 mm | (6) |
| L4 ≥ 1.5 mm | (7) |
| L5 ≥ 0.5 mm | (8) |

When capacitance of the capacitor element is C and a DC breakdown voltage of the capacitor element is BDV, the C and BDV satisfy the inequalities (9) and (10) as defined below, respectively:

| 4 pF ≤ C ≤ 4700 pF | (9) |
| BDV ≥ 4.5 KV | (10) |

The minimum spacing between the first mounting section of and the second mounting section ranges from 3.0 mm to 6.0 mm.

The capacitor element is a stacked capacitor.

According to the structure as described in above, a miniaturized electronic component is realized. Although the electronic component is small in size, the electronic component can be readily produced while achieving a high withstand voltage and realizing a wide range in electric capacity.

It is preferred that the inner electrodes of the stacked capacitor comprise Ni or a Ni alloy, thereby contributing to cost reductions.

It is preferred that the electronic element is a capacitor element.

Particularly preferred is that the electronic element is a stacked capacitor.

It is preferred that the outer most part of the pair of end terminations is formed of a material having a melting point of 200° C. or higher, thereby allowing deterioration of the end terminations due to applied heat to be prevented from occurring even when steps of external heat application such as a solder reflow process and the like are included in the production involving the foregoing electronic component.

It is preferred that the outer most part of the pair of end terminations is formed of a material that includes at least one selected from the group of Cu, Ni, Ag and a high-temperature solder (a tin-lead alloy) having a melting point of 235° C. or higher, thereby allowing the damages inflicted on the end terminations from external heat to be reduced without fail.

It is preferred that the electronic component is further comprises a joining material for joining an end termination and a lead terminal together and the joining material has a melting point of 230° C. or higher, thereby preventing the end termination and lead terminal joined together from being pulled apart from each other or causing poor connections therebetween even when a step of external heat application such as a solder reflow process and the like is included in the production involving the foregoing electronic component. As a result, deterioration in performance of the electronic component at high temperatures is allowed to be prevented.

It is preferred that the corners at both ends of the electronic element are beveled by 0.02 mm or more, thereby allowing creation of cracks in the exterior packaging material to be prevented.

It is preferred that the pair of lead terminals are partially exposed by extending outside from two surfaces opposing each other of the exterior packaging material, respectively, and the respective lead terminals are bent in the same direction as each other, thereby facilitating surface mounting of this electronic component to be performed easily.

It is preferred that the tip ends of the pair of lead terminals are exposed by extending outside from two surfaces opposing each other of the exterior packaging material, respectively, and the tip ends of the respective lead terminals are bent in the same direction as each other, thereby facilitating surface mounting of this electronic component to be performed easily.

It is preferred that the respective lead terminals extended outside are bent along the surfaces of the exterior packaging material with the maximum spacing therefrom measuring 0.05 mm or more, thereby allowing the lead terminals to have leeway for warping readily. Therefore, the warpage occurring on a circuit board is allowed to be absorbed by the lead terminals with reliability, thereby making it possible for cracks, which are liable to be created by an application of stress to junctions between the circuit board and the lead terminals, to be prevented from being formed.

It is preferred that the stray capacitance existing between the pair of lead terminals ranges from 0.1 pF to 5.0 pF, thereby reducing the number of unusable electronic components. As a result, productivity is enhanced.

It is preferred that the electronic component further comprises (a) a stacked capacitor and (b) another stacked capacitor or other component contained in the exterior packaging material. Thus, a combination component containing capacitors, resistors, inductors and the like, for example, can be produced or a capacitor containing a variety of capacitance values becomes available.

Next, a description is given to some of the exemplary embodiments of the present invention.

First Exemplary Embodiment

Figure 2:
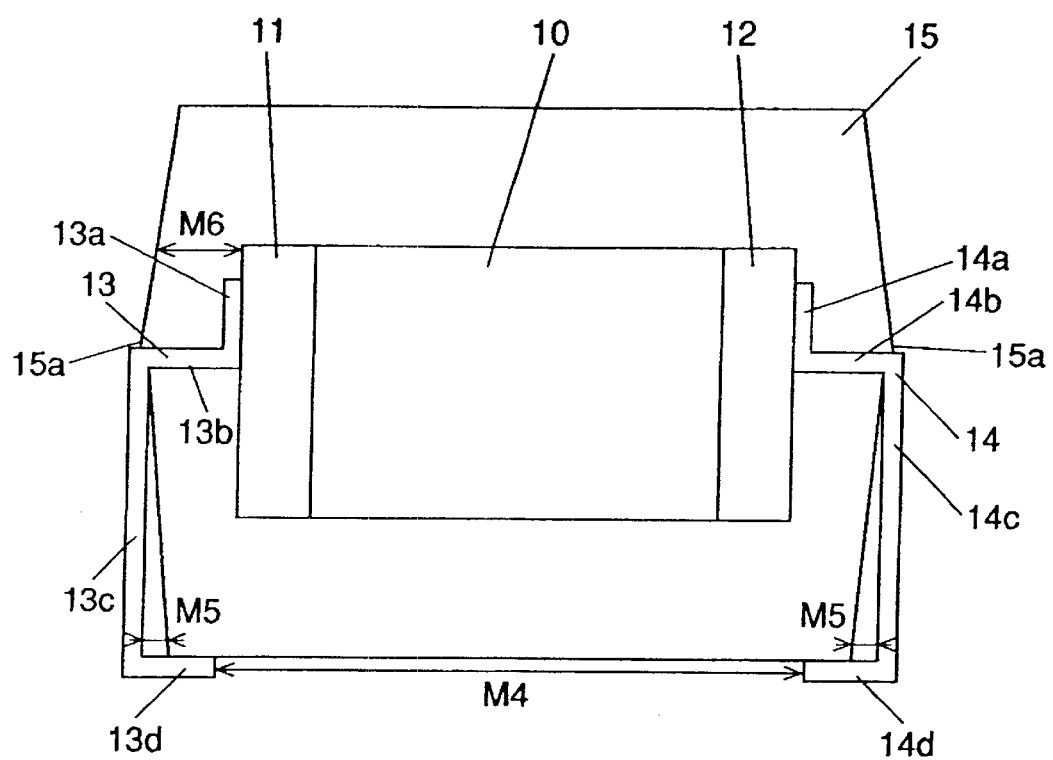
FIG. 2 is a cross-sectional view of the electronic component in the exemplary embodiment of the present invention.

FIG. 1 is a perspective view of an electronic component in a first exemplary embodiment of the present invention and FIG. 2 is a cross-sectional view of the electronic component of FIG. 1.

In the present exemplary embodiment, a capacitor element is used as the electronic component element and a stacked capacitor is used as the capacitor element.

In FIG. 2, a stacked capacitor 10 has a pair of end terminations 11 and 12 disposed on one end and on the other end of the stacked capacitor, respectively. The pair of end terminations 11 and 12 comprise a first end termination 11 and a second end termination 12. A first lead terminal 13 is joined to the first end termination 11 and a second lead terminal 14 is joined to the second end termination 12. An exterior packaging material 15 is provided so as to encapsulate the stacked capacitor 10, part of the first lead terminal 11 and part of the second lead terminal 12. The exterior packaging material 15 is shaped like close to a rectangular prism.

The electronic component thus structured is shaped like close to a rectangular prism, measuring M1 in length, M2 in height M3 in width as FIG. 1 shows. The length M1 ranges from 4.5 mm to 7.5 mm. The height M2 ranges from 1.0 mm to 3.5 mm. The width M3 ranges from 2.0 mm to 7.0 mm. In other words, the outer dimensions of the electronic component having the length M1, height M2 and width M3 can be expressed by the inequalities as described below:

$$4.5 \text{ mm} \leq M1 \leq 7.5 \text{ mm}$$

$$1.0 \text{ mm} \leq M2 \leq 3.5 \text{ mm}$$

$$2.0 \text{ mm} \leq M3 \leq 7.0 \text{ mm}$$

When the length M1 is shorter than 4.5 mm, the height M2 is lower than 1.0 mm or the width M3 is narrower than 2.0 mm, a stacked capacitor, which is large enough to form a sufficiently wide range of electric capacity, is not allowed to be accommodated in the exterior packaging material with the dimensional limits set forth as in above. When the length M1 is longer than 7.5 mm, the height M2 is higher than 3.5 mm or the width M3 is wider than 7.0 mm, the electronic component itself becomes too large to be mounted on a small sized circuit board and the like.

The electronic component comprising the stacked capacitor 10 and the exterior packaging material 15 as described in above is allowed to keep a compact dimension and yet achieve a remarkably wide range of electric capacity.

Next, a detailed description is given to each respective component element in the present exemplary embodiment.

Figure 3:
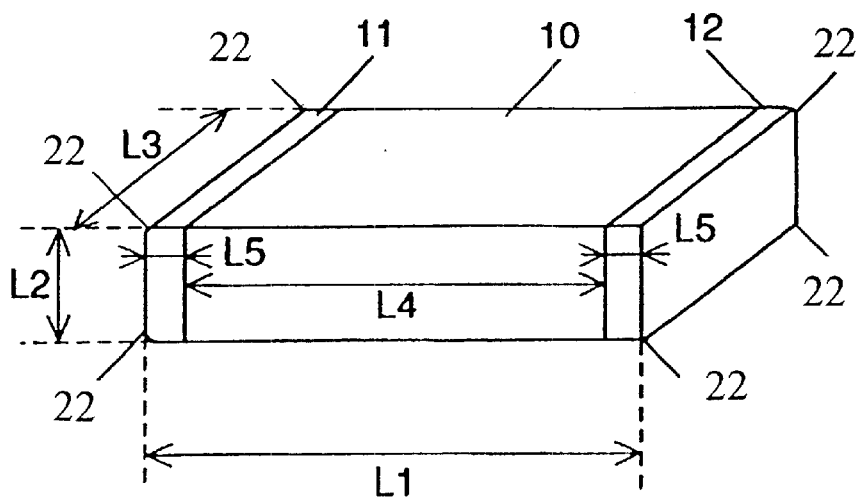
FIG. 3 is a perspective view of a stacked capacitor used in the electronic component in the exemplary embodiment of the present invention.
Figure 4:
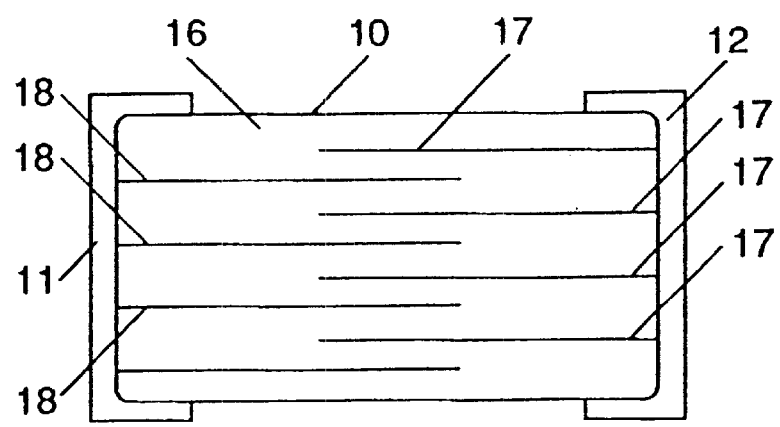
FIG. 4 is a cross-sectional view of the stacked capacitor used in the electronic component in the exemplary embodiment of the present invention.

A description is made on a stacked capacitor 10 with reference to FIG. 3 and FIG. 4.

FIG. 3 is a perspective view of a stacked capacitor used in an electronic component in the present exemplary embodiment of the present invention.

FIG. 4 is a cross-sectional view of the stacked capacitor of FIG. 3.

In FIG. 4, the stacked capacitor 10 comprises a substrate 16, a first inner electrode 17 and a second inner electrode 18. The substrate 16 is made of a dielectric material. It is preferred to use titanium oxide, barium titanate and the like as the dielectric material, for example. The respective first inner electrode 17 and second inner electrode 18 are buried in the substrate 16. The first inner electrode 17 and second inner electrode 18 are formed of a metallic material comprising at least one metal selected from a group of Ag, Ni, Pd and Cu. It is preferred that these inner electrodes comprise separate Ni or a Ni alloy since the costs of these are low.

It is also preferred that the thickness of each of the first inner electrode 17 and second inner electrode 18 ranges from 1 microns to 5 microns and the spacing between the adjoining first inner electrode 17 and second inner electrode 18 is 15 microns or more.

The respective first inner electrodes 17 are electrically joined to a first end termination 11 and the respective second inner electrodes 18 are electrically joined to a second end termination 12. An electric capacity is formed principally between the first inner electrodes 17 and the second inner electrodes 18.

A manufacturing method of the stacked capacitor 10 comprises, for example, the steps of (a) preparing a plurality of dielectric sheets, each of which has an electrode applied by coating onto one of the surfaces thereof, (b) stacking the respective dielectric sheets on top of one another in layers so as not to have the respective electrodes brought into direct contacts with one another and (c) forming the first end termination and second end termination on both ends of the stacked body thus obtained.

It is preferred that the stacked capacitor 10 has dimensions as FIG. 3 indicates. More specifically, when the stacked capacitor 10 measures L1 in length and L2 in height, L3 in width, the spacing between the first termination 11 and the second termination 12 is L4 and the width of each of the first end termination 11 and second end termination 12 formed on the ends of the stacked capacitor 10 is L5, the length L1 ranges from 3.0 mm to 5.5 mm, the height L2 ranges from 0.5 mm to 2.5 mm, the width L3 ranges from 1.5 mm to 3.5 mm, the spacing L4 between the first end termination 11 and the second end termination 12 is 1.5 mm or more and the width of each of the first end termination 11 and second end termination 12 formed on the ends of the stacked capacitor 10 is 0.5 mm or more. In other words, the following inequalities hold:

$$3.0 \text{ mm} \leq L1 \leq 5.5 \text{ mm}$$

$$0.5 \text{ mm} \leq L2 \leq 2.5 \text{ mm}$$

$$1.5 \text{ mm} \leq L3 \leq 3.5 \text{ mm}$$

$$L4 \geq 1.5 \text{ mm}$$

$$L5 \geq 0.5 \text{ mm}$$

When the length L1 is shorter than 3.0 mm, the height L2 is lower than 0.5 mm or the width L3 is narrower than 1.5 mm, the respective areas where the first inner electrode 17 and second inner electrode 18 are formed become smaller, hence leading to a reduction in the spacing between the first inner electrode 17 and the second inner electrode 18. As a result, the number of layers forming the first inner electrodes 17 and second inner electrodes 18 needs to be reduced. Therefore, the required value in electric capacity cannot be realized, thereby making it difficult for a miniaturized electronic component with a wide range in electric capacity to be materialized.

When the length L1 exceeds 5.5 mm, the height L2 exceeds 2.5 mm or the width L3 exceeds 3.5 mm, the stacked capacitor 10 becomes too large to realized a miniaturized electronic component.

Also, when the spacing L4 between the end terminations is smaller than 1.5 mm, it means that the spacing between the first end termination 11 and the second end termination 12 becomes smaller, resulting in deteriorating the dielectric strength and reliability of the stacked capacitor 10. In order to prove this, electronic components specially prepared are subjected to humidity load tests under the measurement conditions where the rated voltage is continuously applied to the electronic component at 40° C. in a relative humidity of 95%. More specifically, the relationships between the lapse of time and the resistance between terminals are measured with the spacing L4 between the end terminations changed variously. The measurement results are shown in Table 1.

TABLE 1

Spacing between End Terminations vs. Humidity Load Test

| End Termi-nation Spacing | Resistance between terminals ($\Omega$) | | | |
|---|---|---|---|---|
| | 250 Hrs | 500 Hrs | 1000 Hrs | 2000 Hrs |
| 1.0 mm | $>1 \times 10^{11}$ | $>1 \times 10^{9}$ | $>1 \times 10^{8}$ | $>1 \times 10^{8}$ |
| 1.5 mm | $>1 \times 10^{11}$ | $>1 \times 10^{11}$ | $>1 \times 10^{10}$ | $>1 \times 10^{10}$ |
| 2.0 mm | $>1 \times 10^{11}$ | $>1 \times 10^{11}$ | $>1 \times 10^{11}$ | $>1 \times 10^{11}$ |
| 2.5 mm | $>1 \times 10^{11}$ | $>1 \times 10^{11}$ | $>1 \times 10^{11}$ | $>1 \times 10^{11}$ |
| 3.0 mm | $>1 \times 10^{11}$ | $>1 \times 10^{11}$ | $>1 \times 10^{11}$ | $>1 \times 10^{11}$ |

As seen in Table 1, the initial resistance between the end terminations exceeds $1 \times 10^{11}$ $\Omega$. When the spacing L4 between the end terminations is 1.0 mm, the resistance between the end terminations decreases to $1 \times 10^{9}$ $\Omega$ after a lapse of 500 hours. This means that insufficient insulation is occurring between the first end termination and the second end termination. On the other hand, when the spacing L4 between the end terminations is 1.5 mm or more, the resistance between the end terminations is kept at $1 \times 10^{10}$ $\Omega$ or higher even after a lapse of 2000 hours. This means that no insufficient insulation is occurring. In other words, it is preferred that the spacing L4 between the end terminations is to exceed 1.5 mm.

When the width L5 of the first end termination 11 and second end termination 12 formed on the respective ends of the stacked capacitor 10 is narrower than 0.5 mm, the strength of a joint between the respective end terminations 11 and 12 and the substrate 16 is reduced.

Also, it is preferred that the capacitance C of the stacked capacitor 10 ranges from 4 pF to 4700 pF, satisfying an inequality of 4 pF $\leq$ C $\leq$ 4700 pF. When the capacitance C is smaller than 4 pF, the noise eliminating effect cannot be achieved, resulting in generating noises. If the capacitance C exceeds 4700 pF, it is made difficult for high frequency noises to be eliminated, resulting in generating high frequency noises. However, the capacitance C can be readily adjusted by changing opposing areas between the first inner electrodes 17 and the second inner electrodes 18, by changing the number of layers forming the first inner electrodes 17 and second inner electrodes 18 and/or by changing the respective electrode areas themselves of the first inner electrodes 17 and second inner electrodes 18 and the like.

It is preferred that the DC breakdown voltage BDV of the stacked capacitor 10 is 4.8 KV or higher, satisfying an inequality of BDV $\geq$ 4.5 K. If the DC breakdown voltage BDV is lower than 4.5 KV, it is difficult to realize an electronic component that can guarantee a rated operating voltage of 2000 V or higher.

It is preferred that each respective sharp corners of the stacked capacitor 10 is removed by incorporating a chamfered surface 22 as FIG. 3 shows. The chamfered surface 22 formed on the respective corners is curved with a radius (R) exceeding 0.02 mm. With the provision of the chamfered surface 22, cracks are prevented from being formed near the corners of the exterior packaging material 15. Next, a description is given to the effectiveness of the chamfered surface 22. Stacked capacitors having corners that are different from capacitor to capacitor in the radius (R) of the curved surface thereof have been prepared. The radiuses (R) employed in preparing the stacked capacitors are 0 mm, 0.02 mm, 0.05 mm, 0.10 mm and 0.50 mm. The exterior packaging material 15 encapsulates each respective stacked capacitor by molding. A material including a resin is used as the exterior packaging material 15. Thus, a variety of electronic components are prepared. These electronic components are subjected to a solder reflow test of 5 seconds at 240° C. Then, these electronic components are left in an atmosphere of 95%RH at 40° C. for 100 hours. Thereafter, the same electronic components are subjected to another solder reflow test of 5 seconds at 240° C. in a high humidity atmosphere of 95%RH at 40° C. An incidence of cracks produced is checked for each respective test sample of the electronic component. The results of findings are summarized in Table 2.

TABLE 2

Incidence of Resin Cracks after Being Left in Humid Atmosphere & Reflowing

| | Incidence of Cracks (%) R (mm) | | | | | |
|---|---|---|---|---|---|---|
| | 0 | 0.02 | 0.05 | 0.10 | 0.20 | 0.50 |
| Reflow (40° C., 5 sec) | 0 | 0 | 0 | 0 | 0 | 0 |
| Humid Atmosphere (40° C., 100 hours) + Reflow (240° C., 5 sec) | 5% | 0 | 0 | 0 | 0 | 0 |

As Table 2 indicates, when an electronic component is used according to only an ordinary solder reflow process, even if the corners of the stacked capacitor are sharp (in other words, the corners are not chamfered or the radius of the chamfered surface 22 is 0 mm), no cracks are produced. However, when an electronic component is used according to a solder reflow process performed in a high humidity atmosphere, a 5% incidence of cracks is recognized with the electronic component comprising a stacked capacitor 10 with the corners thereof not chamfered, (the electronic component containing the stacked capacitor 10 with the radius of the chamfered surface 22 on the edges thereof reduced to 0 mm). More specifically, five electronic components out of 100 electronic components show cracks to have been created. The cracks are formed in the exterior packaging material 15 of each of the five electronic components, extending from the corners of the stacked capacitor 10 to the surface of the exterior packaging material 15. On the other hand, an electronic component using a stacked capacitor 10 with the radius of the chamfered surface 10A thereof exceeding 0.02 mm does not show any cracks at all created thereon even when the electronic component is used according to a solder reflow process performed in a high humidity atmosphere.

Next, a description is given to the first end termination 11 and second end termination 12 provided on the stacked capacitor 10.

Each respective end termination of the first end termination 11 and second end termination 12 is formed of a metallic film, a single layer of conductive material, a plurality of layers of conductive material stacked one over another or a metallic cap joined thereto with a conductive adhesive.

It is preferred that the outer most part (the upper most surface) of each respective end termination of the first end termination 11 and second end termination 12 is formed of a conductive material with a melting point exceeding 200° C. Accordingly, when the electronic component thus structured is exposed to high temperatures during a solder reflow process, these first end termination 11 and second end termination 12 are prevented from suffering thermal damages that are likely to lead to quality deficiencies. As a result, the solder reflow process employed is allowed to be performed with stability and performance characteristics free of thermal damages can be realized with the electronic component.

For example, when a high temperature cream solder with a melting point of 230° C. is used as a means of joining and an electronic component is exposed to heat during a reflow process using that particular cream solder, the electrical connections between junction sections 13a and 14a and the end terminations 11 and 12, respectively, are prevented from suffering quality deficiencies. As a result, the deterioration of characteristics in performance of the electronic component and the like can be prevented.

Further, it is preferred that, when these end terminations 11 and 12 are formed of a metallic film, the metallic film is formed of a material including at least one selected from a group of Ag, Ni and Cu, thereby allowing the costs involved to be reduced and excellent characteristics to be gained from the electronic component. It is preferred that, when these end terminations 11 and 12 are formed of a single layer, the single layer is formed of a material including at least one selected from a group of Ag, Ni, Cu and a high temperature solder (an alloy of tin and lead) with a melting point exceeding 235° C. Particularly preferred is that the single layer is formed of a Ni—Ag alloy or an alloy including at least one selected from a group of Ag, Ni and Cu and other elements, and the like. When these end terminations 11 and 12 are formed of a plurality of layers, the plurality of layers are formed of layers having a property different from one another by stacking one layer over another.

Next, a description is given to the first lead terminal 13 and second lead terminal 14.

It is preferred that the lead terminals 13 and 14 are primarily formed of at least a material selected from a group of Fe, Cu and Ni. By the use of such materials as above, it is made possible for the lead terminals 13 and 14 to be produced readily and also electronic components with more excellent electrical characteristics are allowed to be produced.

The first lead terminal 13 comprises a first junction section 13a, a first extended section 13b and a first mounting section 13c. The first lead terminal 13 is connected to the first end termination 11 at the first junction section 13a. The first extended section 13b is connected to the first junction section 13a and is further extended outward from the exterior packaging material 15. The first mounting section 13c is connected to the first extended section 13b and is further bent along the outer surface of the exterior packaging material 15. The second lead terminal 14 is connected to the second end termination 12 at the second junction section 14a. The second extended section 14b is connected to the second junction section 14a and is further extended outward from the exterior packaging material 15 to be exposed outside. The second mounting section 14c is connected to the second extended section 14b and is further bent along the outer surface of the exterior packaging material 15. The first mounting section 13c and second mounting section 14c are bent so as to have the tip ends of the first lead terminal 13 and second lead terminal 14 aligned in the same direction with each other. When the electronic component is mounted on a circuit board, a joining material such as solder or the like is applied to at least part of the mounting sections 13c and 14c, thereby having the electronic component connected electrically and mechanically to the lands of a circuit board and the like.

Further, it is preferred that the first mounting section 13c and second mounting section 14c have, respectively, a first face down mounting section 13d and a second face down mounting section 14d, both disposed on the bottom surface of the exterior packaging material 15, the bottom surface serving as the mounting surface of the exterior packaging material 15, as FIG. 2 shows. It is preferred that these face down mounting sections 13d and 14d are made flush with the bottom surface of the exterior packaging material 15. These face down mounting sections 13d and 14d are allowed to be joined to the lands of a circuit and the like. Therefore, when an electronic component is surface mounted on a circuit board, these face down mounting sections 13d and 14d allow the electronic component to be mounted on the circuit board with reliability. The face down mounting sections 13d and 14d of FIG. 2 are formed by having the respective tip ends of the first mounting section 13c and second mounting section 14c bent in such directions as the respective tips of the first face down mounting section 13d and second face down section 14d face against each other as FIG. 2 shows. In other words, the face down mounting section 13d and 14d are formed by having the respective tip ends of the first mounting section 13c and second mounting section 14c bent in the directions opposite to each other. The resulting configurations of the lead terminals 13 and 14 are generally referred to as gull-wing. Sometimes as needs require, these face down mounting sections 13d and 14d are formed in such a way as the respective tip ends of the first face down section 13d and second face down section 14d are aligned in the same direction with respect to each other.

It is preferred that the minimum spacing M4 between the first lead terminal 13 and the second lead terminal 14 is 3.0 mm or more when measured outside of the exterior packaging material 15, thereby enhancing the withstand voltage performance of the electronic component when the electronic component is used as an electronic component for a medium voltage application or a high voltage application. Further, a reduction in the withstand voltage due to deterioration in characteristics of other materials after a long period of use can be prevented from occurring. If only miniaturization of the electronic component is aimed at, it is preferred that the spacing M4 between the first lead terminal 13 and the second lead terminal 14 is to be 6.0 mm or less.

It is preferred that the first lead terminal 13 and second lead terminal 14 are exposed outside, respectively, from the surfaces of the exterior packaging material 15 that are facing opposite to each other, thereby allowing the spacing between the first lead terminal 13 and the second lead terminal 14 to be made larger outside of the exterior packaging material 15. As a result, the withstand voltage of the electronic component is made higher.

It is preferred that the first mounting section 13c and second mounting section 14c are disposed along the exterior packaging material 15, respectively, and the maximum spacing M5 between the mounting sections 13c and 14c and the exterior packaging material 15 is 0.05 mm or more. Accordingly, when the electronic component is mounted on a circuit board, long-term reliability of the mounting junction between the electronic component and the circuit board is enhanced. Solder is used to form the mounting junction, for example. More specifically, when the circuit board with the electronic component mounted thereon is warped or a mechanical stress is applied to the mounting junction where the electronic component and the circuit board are joined together, at least the mounting sections 13c and 14c themselves become warped due to the warpage occurring in the mounting junction or the stress applied to the mounting junction, thereby allowing the mounting sections 13c and 14c to absorb the warpage of the circuit board or the stress applied to the mounting junction. Therefore, a mechanical stress applied to the mounting junction, where the circuit board and the mounting sections 13c and 14c are joined together, or the mounting junction, where the circuit board and the face down mounting sections 13d and 14d are joined together, is reduced.

As a result, cracks are prevented from being produced in the mounting junction. Because of the afore-mentioned maximum spacing M5 being 0.05 mm or more, there is enough leeway for the mounting sections 13c and 14c to warp, resulting in enhancement of the foregoing effect.

It is preferred that stray capacitance Cp existing between the first lead terminal 13 and the second lead terminal 14 ranges from 0.1 pF to 5.0 pF. When the stray capacitance Cp exceeds 5.0 pF, variations in the stray capacitance Cp produced at the time of building an electronic component become extremely large. On the other hand, when the stray capacitance Cp remains smaller than 0.1 pF, it becomes difficult for an electronic component with the desired stray capacitance to be produced with precision. For example, when the desired electric capacity of an electronic component is C1 and the electric capacity of a stacked capacitor 10 is C2, it is desirable that C1 ideally equals to C2 plus Cp. However, the electric capacity of the electronic component actually varies more or less from C1. When the capacitance value of C2+Cp exceeds a little the value of C1, (i) the length of the respective lead terminals 13 and 14 extended outside the exterior packaging material 15 is made shorter, thereby reducing the opposing areas between the lead terminals 13 and 14 or (ii) the stray capacitance Cp is adjusted readily by a little adjustment such as trimming the lead terminals 13 and 14 and the like, thereby allowing the stray capacitance Cp to be reduced. However, when the value of "C2+Cp" becomes smaller than C1, there is no easy method to increase the value of "C2+Cp". By making an arrangement that the stray capacitance Cp exceeds 0.1 pF, even when the value C2 is a little smaller than the desired value in electric capacity, the stray capacitance Cp can make up for the difference in electric capacity. Therefore, an electronic component with the difficulty in adjusting electric capacity because of the value C1 being smaller than the desired electric capacity is prevented from being produced. Thus, with the stray capacitance Cp made to range from 0.1 pF to 5.0 pF, an electronic component having a desired electric capacity value is allowed to be produced without difficulties, thereby contributing to enhancement in productivity.

It is preferred that the first lead terminal 13 and second lead terminal 14 are generally of the same configuration with each other, thereby allowing the component count to be reduced with a resulting contribution to enhancement in productivity. Further, the first lead terminal 13 and second lead terminal 14 can lead out of the exterior packaging material 15 at respective positions thereof situated at a height level almost common with each other. As a result, an electronic component realizing an excellent positional symmetry is made available.

Next, a description is given to the exterior packaging material 15.

It is preferred that the exterior packaging material 15 is formed of optocresolnovorak base epoxy resin, biphenyl base epoxy resin, pentadiene base epoxy resin and the like. The exterior packaging material 15 is put in place so as to encapsulate the stacked capacitor 10, first junction section 13a, second junction section 14a, first extended section 13b and second extended section 14b. In other words, the exterior packaging material 15 has part of the lead terminals 13 and 14 buried therein.

It is preferred that the minimum spacing between the surface of the exterior packaging material 15 and the surface of the stacked capacitor 10, i.e., the thickness of the thinnest wall of the exterior packaging material 15 is 0.1 mm or more, resulting in enhancement of the withstand voltage of the encapsulation provided by the exterior packaging material 15. Conversely, when the thickness of the exterior packaging material 15 is thinner than 0.1 mm, the withstand voltage is degraded.

It is preferred that a lead out area 15a, where the lead terminals 13 and 14 lead outside from the exterior packaging material 15, respectively, protrudes from the rest of surface areas of the exterior packaging material 15. Accordingly, the mechanical strength of the root of the respective mounting sections 13c and 14c is reinforced, thereby preventing a breakage such as crimping and the like of the first lead terminal 13 and second lead terminal 14 from occurring. Further, the lead out area 15a of the exterior packaging material 15, where the lead terminals 13 and 14 lead outside, respectively, and moisture is most likely to infiltrate, is thicker than other areas of the exterior packaging material 15, resulting in contributing to enhancement of weather resistance.

Thus, not only miniaturization of an electronic component is achieved but also a wider range of electric capacity is incorporated in such a miniaturized electronic component. In addition, the miniaturized electronic component has excellent electrical characteristics such as a high withstand voltage, a strong dielectric strength and the like in a high humidity environment. Furthermore, when the electronic component is mounted on a circuit board for electrical connections, poor connections between the electronic component and the circuit board caused by warpage of the circuit board and the like is prevented from occurring.

Second Exemplary Embodiment

Next, a description is given to a typical method for manufacturing the electronic component structured as described in above.

First, (a) a stacked capacitor 10 with a first end termination 11 and a second end termination 12 is prepared. Then, (b) a first lead terminal 13 is connected to the first end termination 11 and a second lead terminal 14 is connected to the second end termination 12, and (c) an exterior packaging material 15 is used to encapsulate the entire stacked capacitor 10, part of the first lead terminal 13 and part of the second lead terminal 14. It is preferred that the afore-mentioned epoxy resins are used to form the exterior packaging material 15. The exterior packaging material 15 is molded by using a molding machine. Next, (d) the first lead terminal 13 and second lead terminal 14, both sticking out of the exterior packaging material 15 are bent along the outside shape of the exterior packaging material 15 as FIG. 1 and FIG. 2 show to make a first junction section 13a, first extended section 13b, first mounting section 13c, second junction section 14a, second extended section 14b, and second mounting section 14c. It is preferred that the foregoing bending process further makes a first face down mounting section 13d and second face down mounting section 14d. Thus, the electronic component is completed.

Third Exemplary Embodiment

Figure 5:
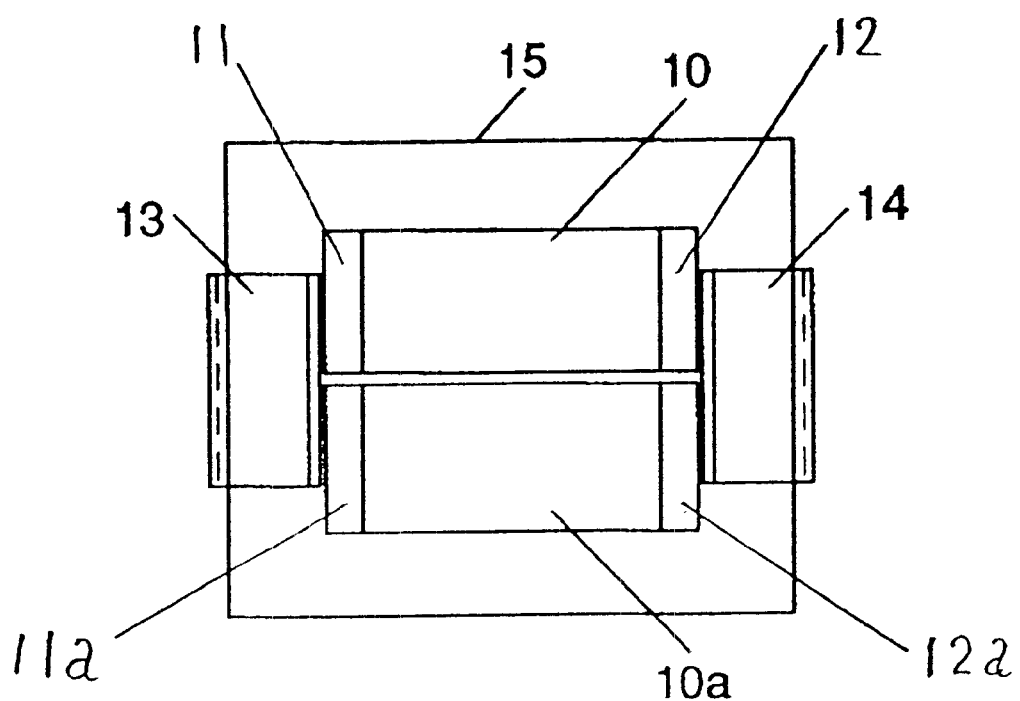
FIG. 5 is a plan view of an electronic component in another exemplary embodiment of the present invention.
Figure 6:
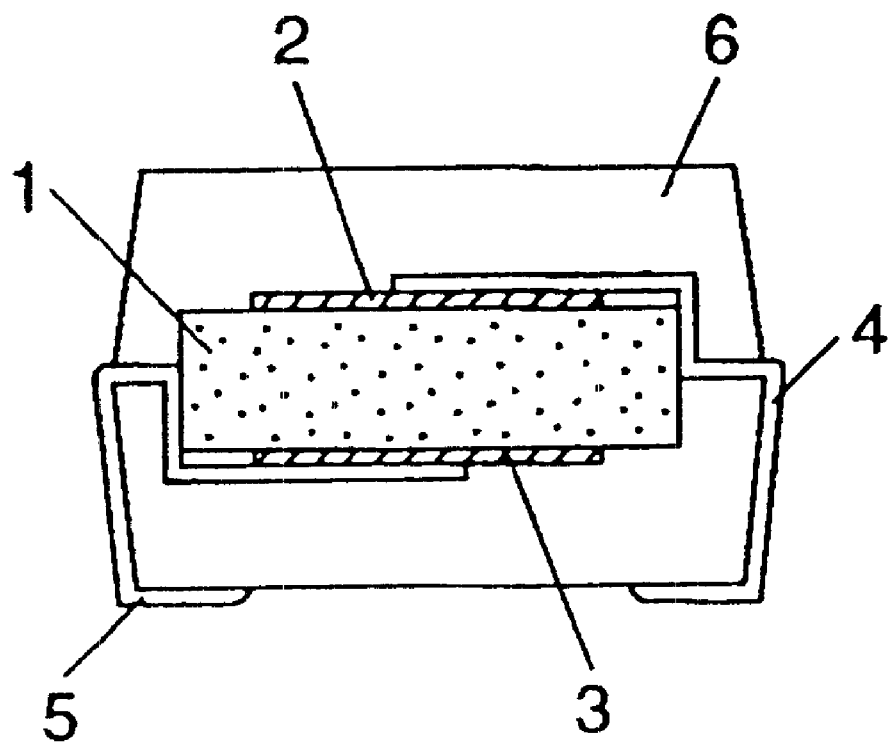
FIG. 6 is a cross-sectional view of a prior art electronic component.

A description is given to an electronic component in a third exemplary embodiment of the present invention with reference to FIG. 5.

The electronic component described in the first exemplary embodiment has a stacked capacitor 10 encapsulated in the exterior packaging material 15. FIG. 5 is a cross-sectional view of an electronic component in another exemplary embodiment of the present invention. In FIG. 5, the electronic component comprises a plurality of stacked capacitors, a first lead terminal 13, second lead terminal 14 and exterior packaging material 15. The plurality of stacked capacitors are connected in parallel with one another by the first lead terminal 13 and second lead terminal 14. There are a stacked capacitor 10 and further another stacked capacitor 10a, for example, included in the plurality of stacked capacitors. The respective stacked capacitors of the plurality of stacked capacitors have the same capacitance with one another or capacitance different from one another. The stacked capacitor 10 has a first end termination 11 and a second end termination 12 and the other stacked capacitor 10a has another first end termination 11a and another second end termination 12a.

The electronic component with a plurality of capacitors thus produced has the same outside shape as the electronic component in the first exemplary embodiment has. More specifically, the electronic component is shaped almost like a rectangular prism, measuring M1 in length, M2 in height and M3 in width. The length M1 ranges from 4.5 mm to 7.5 mm, the height M2 ranges from 1.0 mm to 3.5 mm and the width M3 ranges from 2.0 mm to 7.0 mm.

It is preferred that each respective stacked capacitor of the plurality of stacked capacitors has capacitance ranging from 4 pF to 4700 pF.

It is preferred that each respective stacked capacitor of the plurality of stacked capacitors has a DC breakdown voltage BDV of 4.8 KV or higher.

Accordingly, by employing a plurality of stacked capacitors, an electronic component having the capacitance as desired, ranging from a low value to a high value in capacitance, is allowed to be produced. As a result, a wide selection of electronic components with the abundance in kinds are made readily available.

Fourth Exemplary Embodiment

The electronic components in the foregoing first, second and third exemplary embodiments comprise a stacked capacitor. As opposed to the foregoing, an electronic component in a fourth exemplary embodiment of the present invention comprises a stacked capacitor, another electronic element and an exterior packaging material encapsulating the stacked capacitor and the other electronic element. As such another electronic element is used an inductance element or a resistance element, for example. With the electronic component of the present exemplary embodiment, (a) the DC breakdown voltage, capacitance, configuration and dimensions of the stacked capacitor, (b) the configuration and dimensions of the exterior packaging material, (c) the configuration of the lead terminals and the like are the same as in the first exemplary embodiment.

Thus, an integrated electronic component is realized. The integrated electronic component as such is allowed to benefit from the same performance effects as in the first exemplary embodiment.

Fifth Exemplary Embodiment

A description is partially given to an electronic component in a fifth exemplary embodiment of the present invention in the foregoing first exemplary embodiment. More specifically, the electronic component in the present exemplary embodiment comprises:
(a) a capacitor element,
wherein the capacitor element is shaped like close to a rectangular prism,
wherein the capacitor element has a pair of end terminations disposed on both ends thereof, and
wherein the pair of end terminations are formed of a first end termination disposed on a first end out of both ends and a second termination disposed on a second end out of both ends;
(b) a first lead terminal connected to the first end termination,
wherein the first lead terminal has a first junction section where a connection is made with the first end termination;
(c) a second lead terminal connected to the second end termination,
wherein the second lead terminal has a second junction section where a connection is made with the second end termination;
(d) an exterior packaging material disposed in such a way as encapsulating the capacitor element, first end termination, second end termination, first junction section and second junction section,
wherein the exterior packaging material is shaped like close to a rectangular prism.

The first lead terminal has a first mounting section that is exposed from the exterior packaging material and the second lead terminal has a second mounting section that is exposed from the exterior packaging material.

The first mounting section is formed by having the first lead terminal bent so as to be almost flush with the surface of the exterior packaging material.

The second mounting section is formed by having the second lead terminal bent so as to be almost flush with the surface of the exterior packaging material.

The first and second mounting sections are bent in the same direction with each other.

The tip ends of the first and second mounting sections are extended to reach the same surface of the exterior packaging material.

The maximum spacing between the first and second mounting sections and the respective surfaces of the exterior packaging material is 0.5 mm or more.

Accordingly, when the first and second mounting sections are joined to a circuit board for mounting the electronic component thereon, the respective first and second mounting sections are allowed to have leeway for warpage.

It is preferred that the exterior packaging material protrudes at the areas, where the first lead terminal and second lead terminal lead out, respectively, from the exterior packaging material, above the rest of areas of the exterior packaging material.

The respective first and second lead terminals lead outside from the protruded areas of the exterior packaging material.

The first mounting section has a first face down mounting section and the second mounting section has a second face down mounting section.

The first and second mounting sections are bent along the surface of the exterior packaging material so as to have the first and second face down mounting sections aligned in parallel to the bottom surface of the exterior packaging material, respectively.

The afore-mentioned maximum spacing is provided between the first and second mounting sections and the exterior packaging material, respectively. Accordingly, when the first and second face down mounting sections are connected to a circuit board by surface mounting of the electronic component, the respective first and second mounting sections are allowed to have leeway for warpage.

The length M1, height M2 and width M3 of the exterior packaging material are the same as what is described in the first exemplary embodiment as FIG. 1 shows. The length L1, height L2 and width L3 are the same as what is described in the first exemplary embodiment as FIG. 3 shows. Also, the spacing L4 between the first end termination and the second end termination and the width L5 of the respective first and second end terminations on the side surface of the capacitor element are the same as what is described in the first exemplary embodiment.

The capacitance C and DC breakdown voltage BDV of the capacitor element are the same as what is described in the first exemplary embodiment.

The minimum spacing between the first mounting section and the second mounting section ranges from 3.0 mm to 6.0 mm.

Accordingly, when an electronic component is mounted on a circuit board for connection, defects due to poor connections between the electronic component and the circuit board and the like, caused by warpage and the like of the circuit board can be prevented from occurring.

As described in above, the present invention allows an electronic component, which facilitates miniaturization thereof, to be made available. In addition, even if the miniaturization of the electronic component is achieved, the miniaturized electronic component still can realize at least one of the followings:

(i) a wide range of electric capacity;
(ii) good manufacturability;
(iii) excellent electrical characteristics; and
(iv) the prevention of defects due to poor connections between the electronic component and a circuit board and the like caused by warpage of the circuit board that occurs upon connecting the electronic component to the circuit board.

What is claimed is:
1. An electronic component comprising:
(a) a capacitor element, said capacitor element being shaped substantially like a rectangular prism, said capacitor element having a pair of end terminations, said pair of end terminations comprise a first end termination disposed on a first end of said capacitor element and a second termination disposed on a second end of said capacitor element;
(b) a first lead terminal connected to said first end termination, said first lead terminal having a first junction section where a connection is made with said first end termination;
(c) a second lead terminal connected to said second end termination, said second lead terminal having a second junction section where a connection is made with said second end termination;
(d) an exterior packaging material encapsulating said capacitor element, first end termination, second end termination, first junction section and second junction section, said exterior packaging material is substantially shaped like a rectangular prism,
wherein said first lead terminal has a first mounting section that is exposed from said exterior packaging material and said second lead terminal has a second mounting section that is exposed from said exterior packaging material;

wherein a maximum length of said exterior packaging material is 7.5 mm or less;

wherein a maximum length of said capacitor element is 5.5 mm or less;

wherein a capacitance (C) of said capacitor element satisfies an inequality of 4 pF$\leq$C$\leq$4700 pF;

wherein a DC breakdown voltage (BDV) satisfies an inequality of BDV$\geq$4.5 KV, and wherein an area of said exterior packaging material, out of which said respective first and second lead terminals extend outside of said exterior packaging material, protrudes from other areas of said exterior packaging material and said respective first and second lead terminals extend out from said protruded area of said exterior packaging material.

2. The electronic component according to claim 1, wherein when said exterior packaging material measures M1 in length, M2 in height and M3 in width, said M1, M2 and M3 satisfy the inequalities (1), (2) and (3) as defined below, respectively:

| | |
|---|---|
| 4.5 mm $\leq$ M1 $\leq$ 7.5 mm | (1) |
| 1.0 mm $\leq$ M2 $\leq$ 3.5 mm | (2) |
| 2.0 mm $\leq$ M3 $\leq$ 7.0 mm | (3) | and wherein when said capacitor element measures L1 in length, L2 in height and L3 in width, a spacing between said first end termination and said second end termination is L4 and a width of said respective first and second end terminations measured on a side surface of said capacitor element is L5, said L1, L2, L3, L4 and L5 satisfy the inequalities (4), (5), (6), (7) and (8) as defined below, respectively:

| | |
|---|---|
| 3.0 mm $\leq$ L1 $\leq$ 5.5 mm | (4) |
| 0.5 mm $\leq$ L2 $\leq$ 2.5 mm | (5) |
| 1.5 mm $\leq$ L3 $\leq$ 3.5 mm | (6) |
| L4 $\geq$ 1.5 mm | (7) |
| L5 $\geq$ 0.5 mm | (8) |

3. The electronic component according to claim 1, wherein a minimum spacing M4 between said first mounting section and said second mounting section ranges from 3.0 mm to 6.0 mm.

4. The electronic component according to claim 1, wherein a minimum distance between a surface of said exterior packaging material and a surface of said capacitor element is 0.1 mm or more.

5. The electronic component according to claim 1, wherein said capacitor element is a multi-layer capacitor.

6. The electronic component according to claim 1, wherein said capacitor element shaped like close to said rectangular prism has a chamfered surface formed on each respective corner thereof, and wherein said each respective chamfered surface is curved with a radius of 0.02 mm or larger.

7. An electronic component comprising:

(a) a capacitor element, said capacitor element being shaped substantially like a rectangular prism, said capacitor element having a pair of end terminations, said pair of end terminations comprise a first end termination disposed on a first end of said capacitor element and a second termination disposed on a second end of said capacitor element;

(b) a first lead terminal connected to said first end termination, said first lead terminal having a first junction section where a connection is made with said first end termination;

(c) a second lead terminal connected to said second end termination, said second lead terminal having a second junction section where a connection is made with said second end termination;

(d) an exterior packaging material encapsulating said capacitor element, first end termination, second end termination, first junction section and second junction section, said exterior packaging material is substantially shaped like a rectangular prism, wherein said first lead terminal has a first mounting section that is exposed from said exterior packaging material and said second lead terminal has a second mounting section that is exposed from said exterior packaging material;

wherein a maximum length of said exterior packaging material is 7.5 mm or less;

wherein a maximum length of said capacitor element is 5.5 mm or less;

wherein a capacitance (C) of said capacitor element satisfies an inequality of 4 pF<C<4700 pF;

wherein a DC breakdown voltage (BVD) satisfies an inequality of BDV>4.5 KV, wherein said first mounting section is formed by bending said first lead terminal so as to make said first lead terminal almost flush with said exterior packaging material's surface and said second mounting section is formed by bending said second terminal so as to make said second lead terminal almost flush with said exterior packaging material's surface, and wherein a maximum distance between said first and second mounting sections and said exterior packaging material's surface is 0.05 mm or more, respectively.

8. The electronic component according to claim 7, wherein when said exterior packaging material measures M1 in length, M2 in height and M3 in width, said M1, M2 and M3 satisfy the inequalities (1), (2) and (3) as defined below, respectively:

| | |
|---|---|
| 4.5 mm $\leq$ M1 $\leq$ 7.5 mm | (1) |
| 1.0 mm $\leq$ M2 $\leq$ 3.5 mm | (2) |
| 2.0 mm $\leq$ M3 $\leq$ 7.0 mm | (3) | and, wherein when said capacitor element measures L1 in length, L2 in height and L3 in width, a spacing between said first end termination and said second end termination is L4 and a width of said respective first and second end terminations measured on a side surface of said capacitor element is L5, said L1, L2, L3, L4 and L5 satisfy the inequalities (4), (5), (6) (7) and (8) as defined below respectively:

| | |
|---|---|
| 3.0 mm $\leq$ L1 $\leq$ 5.5 mm | (4) |
| 0.5 mm $\leq$ L2 $\leq$ 2.5 mm | (5) |
| 1.5 mm $\leq$ L3 $\leq$ 3.5 mm | (6) |
| L4 $\geq$ 1.5 mm | (7) |

-continued $$L5 \geq 0.5 \text{ mm} \quad (8).$$

9. The electronic component according to claim 7, wherein a minimum spacing M4 between said first mounting section and said second mounting section ranges from 3.0 mm to 6.0 mm.

10. The electronic component according to claim 7, wherein a minimum distance between a surface of said exterior packaging material and a surface of said capacitor element is 0.1 mm or more.

11. The electronic component according to claim 7, wherein said capacitor element is a multi-layer capacitor.

12. The electronic component according to claim 7, wherein said capacitor element has a chamfered surface formed on each respective corner thereof and wherein said each respective chambered surface is curved with a radius of 0.02 mm or larger.

13. An electronic component comprising:
(a) a capacitor element, said capacitor element being shaped substantially like a rectangular prism, said capacitor element having a pair of end terminations, said pair of end terminations comprise a first end termination disposed on a first end of said capacitor element and a second termination disposed on a second end of said capacitor element;
(b) a first lead terminal connected to said first end termination, said first lead terminal having a first junction section where a connection is made with said first end termination;
(c) a second lead terminal connected to said second end termination, said second lead terminal having a second junction section where a connection is made with said second end termination; and
(d) an exterior packaging material encapsulating said capacitor element, first end termination, second end termination, first junction section and second junction section said exterior packaging material is substantially shaped like a rectangular prism,
wherein said first lead terminal has a first mounting section that is exposed from said exterior packaging material and said second lead terminal has a second mounting section that is exposed from said exterior packaging material;
wherein when said exterior packaging material measures M1 in length, M2 in height and M3 in width, said M1, M2 and M3 satisfy the inequalities (1), (2) and (3) as defined below, respectively;

$$\begin{aligned} 4.5 \text{ mm} \leq M1 \leq 7.5 \text{ mm} &\quad (1) \\ 1.0 \text{ mm} \leq M2 \leq 3.5 \text{ mm} &\quad (2) \\ 2.0 \text{ mm} \leq M3 \leq 7.0 \text{ mm} &\quad (3) \end{aligned}$$

wherein when said capacitor element measures L1 in length, L2 in height and L3 in width, a spacing between said first end termination and said second end termination is L4 and a width of said respective first and second end terminations measured on a side surface of said capacitor element is L5, said L1, L2, L3, L4 and L5 satisfy the inequalities (4), (5), (6), (7) and (8) as defined below, respectively;

$$\begin{aligned} 3.0 \text{ mm} \leq L1 \leq 5.5 \text{ mm} &\quad (4) \\ 0.5 \text{ mm} \leq L2 \leq 2.5 \text{ mm} &\quad (5) \\ 1.5 \text{ mm} \leq L3 \leq 3.5 \text{ mm} &\quad (6) \\ L4 \geq 1.5 \text{ mm} &\quad (7) \\ L5 \geq 0.5 \text{ mm} &\quad (8) \end{aligned}$$

wherein a capacitance (C) of said capacitor element and a DC breakdown voltage (BDV) satisfy the inequalities (9) and (10) as defined below, respectively;

$$\begin{aligned} 4 \text{ pF} \leq C \leq 4700 \text{ pF} &\quad (9) \\ BDV \geq 4.5 \text{ KV} &\quad (10) \end{aligned}$$

wherein a minimum spacing between said first mounting section and said second mounting section ranges from 3.0 mm to 6.0 mm;
wherein said capacitor element is a multi-layer capacitor;
wherein said first mounting section is formed by bending said first lead terminal so as to be substantially flush with said exterior packaging material's surface;
wherein said second mounting section is formed by bending said second lead terminal so as to be substantially flush with said exterior packaging in material's surface; and
wherein a maximum spacing between said first mounting section and said exterior packaging material's surface and between said second mounting section and said exterior packaging material's surface, respectively, is 0.05 mm or more.

14. The electronic component according to claim 13, wherein a minimum spacing between a surface of said exterior packaging material and a surface of said capacitor element is 0.1 mm or more.

15. The electronic component according to claim 13, wherein said multi-layer capacitor comprises an inner electrode; and said inner electrode comprises at least one selected from nickel and a nickel alloy.

16. The electronic component according to claim 13, wherein an outer most part of said first end termination and second end termination, respectively, is formed of a material with a melting point of 200° C. or higher.

17. The electronic component according to claim 16, wherein said each respective outer most part of said first end termination and second end termination is formed of a material including at least one selected from a group consisting of Cu, Ni, Ag and high temperature solder (a tin-lead alloy) with a melting point of 235° C. or higher.

18. The electronic component according to claim 13, wherein said first junction section and second junction section are, respectively, formed of a material with a melting point of 230° C. or higher.

19. The electronic component according to claim 13, wherein said multi-layer capacitor has a chamfered surface at each respective corner edge thereof and said chamfered surface is curved with a radius of 0.02 mm or larger.

20. The electronic component according to claim 13, wherein said first mounting section and second mounting section are, respectively, extend out of an opposing surface of said exterior packaging material; and said first mounting section and second mounting section are bent in a same direction.

21. The electronic component according to claim 20, wherein each respective tip end of said first mounting section and second mounting section extends to reach a same surface of said exterior packaging material.

22. The electronic component according to claim 13,
wherein said first mounting section has a first face down mounting section;
wherein said second mounting section has a second face down mounting section; and
wherein said first lead terminal and second lead terminal are bent so as to have said respective first face down mounting section and second face down mounting section made flush with a same surface of said exterior packaging material.

23. The electronic component according to claim 13, wherein stray capacitance created between said first lead terminal and said second lead terminal ranges from 0.1 pF to 5.0 pF.

24. An electronic component comprising:
(a) a plurality of capacitor elements, said plurality of capacitor elements each being shaped substantially like a rectangular prism, said plurality of capacitor elements each having a pair of end terminations, said pair of end terminations comprise a first end termination disposed on a first end of each of said plurality of capacitor elements and a second termination disposed on a second end of each of said plurality of capacitor elements;
(b) a first lead terminal connected to said first end terminations, said first lead terminal having a first junction section where a connection is made with said first end terminations;
(c) a second lead terminal connected to said second end terminations, said second lead terminal having a second junction section where a connection is made with said second end terminations; and
(d) an exterior packaging material encapsulating said plurality of capacitor elements, first end terminations, second end terminations, first junction section, and second junction section, said exterior packaging material is substantially shaped like a rectangular prism,
wherein said first lead terminal has a first mounting section that is exposed from said exterior packaging material and said second lead terminal has a second mounting section that is exposed from said exterior packaging material;
wherein when said exterior packaging material measures M1 in length, M2 in height and M3 in width, said M1, M2 and M3 satisfy the inequalities (1), (2) and (3) as defined below, respectively;

| | |
|---|---|
| 4.5 mm ≦ M1 ≦ 7.5 mm | (1) |
| 1.0 mm ≦ M2 ≦ 3.5 mm | (2) |
| 2.0 mm ≦ M3 ≦ 7.0 mm | (3) | wherein when said plurality of capacitor elements measures L1 in length, L2 in height and L3 in width, a spacing between said first end terminations and said second end terminations is L4 and a width of said respective first and second end terminations measured on a side surface of said plurality of capacitor elements is L5, said L1, L2, L3, L4 and L5 satisfy the inequalities (4), (5), (6), (7) and (8) as defined below, respectively;

| | |
|---|---|
| 3.0 mm ≦ L1 ≦ 5.5 mm | (4) |
| 0.5 mm ≦ L2 ≦ 2.5 mm | (5) |
| 1.5 mm ≦ L3 ≦ 3.5 mm | (6) |
| L4 ≧ 1.5 mm | (7) |
| L5 ≧ 0.5 mm | (8) | wherein a capacitance (C) of said capacitor element and a DC breakdown voltage (BDV) satisfy the inequalities (9) and (10) as defined below, respectively;

| | |
|---|---|
| 4 pF ≦ C ≦ 4700 pF | (9) |
| BDV ≧ 4.5 KV | (10) | wherein a minimum spacing between said first mounting section and said second mounting section ranges from 3.0 mm to 6.0 mm;
wherein each of said plurality of capacitor elements is a multi-layer capacitor;
wherein said first mounting section is formed by bending said first lead terminal so as to be substantially flush with said exterior packaging material's surface;
wherein said second mounting section is formed by bending said second lead terminal so as to be substantially flush with said exterior packaging in material's surface; and
wherein a maximum spacing between said first mounting section and said exterior packaging material's surface and between said second mounting section and said exterior packaging material's surface, respectively, is 0.05 mm or more.

25. The electronic component according to claim 24, wherein a minimum spacing between a surface of said exterior packaging material and a surface of said capacitor element is 0.1 mm or more.

26. The electronic component according to claim 24,
wherein each respective capacitor element of said plurality of capacitor elements has at least a value of capacitance selected from (i) capacitance same with one another and (ii) capacitance different from one another.

27. An electronic component comprising:
(a) a capacitor element, said capacitor element being shaped substantially like a rectangular prism, said capacitor element having a pair of end terminations; said pair of end terminations comprise a first end termination disposed on a first end of said capacitor element and a second termination disposed on a second end of said capacitor element;
(b) a first lead terminal connected to said first end termination, said first lead terminal having a first junction section where a connection is made with said first end termination;
(c) a second lead terminal connected to said second end termination, said second lead terminal having a second junction section where a connection is made with said second end termination;
(d) other electronic elements; and
(e) an exterior packaging material encapsulating said capacitor element, first end termination, second end termination, first junction section, and second junction section said exterior packaging material is substantially shaped like a rectangular prism, wherein said first lead terminal has a first mounting section that is exposed from said exterior packaging material and said second lead terminal has a second mounting section that is exposed from said exterior packaging material;

wherein when said exterior packaging material measures M1 in length, M2 in height and M3 in width, said M1, M2 and M3 satisfy the inequalities (1), (2) and (3) as defined below, respectively;

$$4.5 \text{ mm} \leq M1 \leq 7.5 \text{ mm} \quad (1)$$
$$1.0 \text{ mm} \leq M2 \leq 3.5 \text{ mm} \quad (2)$$
$$2.0 \text{ mm} \leq M3 \leq 7.0 \text{ mm} \quad (3)$$

wherein when said capacitor element measures L1 in length, L2 in height and L3 in width, a spacing between said first end termination and said second end termination is L4 and a width of said respective first and second end terminations measured on a side surface of said capacitor element is L5, said L1, L2, L3, L4 and L5 satisfy the inequalities (4), (5), (6), (7) and (8) as defined below, respectively;

$$3.0 \text{ mm} \leq L1 \leq 5.5 \text{ mm} \quad (4)$$
$$0.5 \text{ mm} \leq L2 \leq 2.5 \text{ mm} \quad (5)$$
$$1.5 \text{ mm} \leq L3 \leq 3.5 \text{ mm} \quad (6)$$
$$L4 \geq 1.5 \text{ mm} \quad (7)$$
$$L5 \geq 0.5 \text{ mm} \quad (8)$$

wherein a capacitance (C) of said capacitor element and a DC breakdown voltage (BDV) satisfy the inequalities (9) and (10) as defined below, respectively;

$$4 \text{ pF} \leq C \leq 4700 \text{ pF} \quad (9)$$
$$BDV \geq 4.5 \text{ KV} \quad (10)$$

wherein a minimum spacing between said first mounting section and said second mounting section ranges from 3.0 mm to 6.0 mm;

wherein said capacitor element is a multi-layer capacitor;

wherein said first mounting section is formed by bending said first lead terminal so as to be substantially flush with said exterior packaging material's surface;

wherein said second mounting section is formed by bending said second lead terminal so as to be substantially flush with said exterior packaging in material's surface and wherein a maximum spacing between said first mounting section and said exterior packaging material's surface and between said second mounting section and said exterior packaging material's surface, respectively, is 0.05 mm or more.

28. The electronic component according to claim 27, wherein a minimum spacing between a surface of said exterior packaging material and a surface of said capacitor element is 0.1 mm or more.

29. The electronic component according to claim 27, wherein said other electronic elements comprise at least one out of an inductance element and a resistance element.

30. An electronic component comprising:

(a) a capacitor element, said capacitor element being shaped substantially like a rectangular prism, said capacitor element having a pair of end terminations, said pair of end terminations comprise a first end termination disposed on a first end of said capacitor element and a second termination disposed on a second end of said capacitor element;

(b) a first lead terminal connected to said first end termination, said first lead terminal having a first junction section where a connection is made with said first end termination;

(c) a second lead terminal connected to said second end termination, said second lead terminal having a second junction section where a connection is made with said second end termination;

(d) an exterior packaging material encapsulating said capacitor element, first end termination, second end termination, first junction section and second junction section said exterior packaging material is substantially shaped like a rectangular prism, wherein said first lead terminal has a first mounting section that is exposed from said exterior packaging material and said second lead terminal has a second mounting section that is exposed from said exterior packaging material;

wherein said first mounting section is formed by bending said first lead terminal so as to be made substantially flush with said exterior packaging material's surface;

wherein said second mounting section is formed by bending said second lead terminal so as to be made substantially flush with said exterior packaging material s surface;

wherein said first mounting section and second mounting section are bent in a same direction with each other;

wherein each respective tip end of said first mounting section and second mounting section extends to reach a same surface of said exterior packaging material; and wherein a maximum spacing between said first mounting section and said exterior packaging material's surface and between said second mounting section and said exterior packaging material's surface, respectively, is 0.05 mm or more, thereby allowing said respective first and second mounting sections to have leeway for warpage when said first and second mounting sections are mounted on a circuit board to be connected therewith.

31. The electronic component according to claim 30, wherein said first mounting section has a first face down mounting section and said second mounting section has a second face down mounting section; and wherein said first lead terminal and second lead terminal are bent so as to have said first face down mounting section and second face down mounting section made flush with a bottom surface of said exterior packaging material, thereby allowing said first face down mounting section and second face down mounting section to be surface mounted on a circuit board for connecting therewith.

32. The electronic component according to claim 30, wherein said exterior packaging material has an area, where said respective first lead terminal and second lead terminal lead outside therefrom, protruded from other areas of said exterior packaging material;

wherein said respective first lead terminal and second lead terminal lead out of said protruded area of said exterior packaging material;

wherein said first mounting section has a first face down mounting section and said second mounting section has a second face down mounting section;

wherein said respective first mounting section and second mounting section are bent so as to be flush with a surface of said exterior packaging material;

wherein said respective first mounting section and second mounting section are bent so as to have said respective first face down mounting section and second face down mounting section made flush with a bottom surface of said exterior packaging material; and wherein said maximum spacing is provided between said first mounting section and said exterior packaging material and between said second mounting section and said exterior packaging material, respectively, thereby allowing said respective first mounting section and second mounting section to have leeway for warpage when said first face down mounting section and second face down mounting section are surface mounted on circuit board to be connected therewith.

33. The electronic component according to claim 30, wherein said capacitor element is a multi-layer capacitor.

34. The electronic component according to claim 30, wherein when said exterior packaging material measures M1 in length, M2 in height and M3 in width, said M1, M2 and M3 satisfy the inequalities (1), (2) and (3) as defined below, respectively;

$$4.5 \text{ mm} \leq M1 \leq 7.5 \text{ mm} \quad (1)$$
$$1.0 \text{ mm} \leq M2 \leq 3.5 \text{ mm} \quad (2)$$
$$2.0 \text{ mm} \leq M3 \leq 7.0 \text{ mm} \quad (3)$$

wherein when said capacitor element measures L1 in length, L2 in height and L3 in width, a spacing between said first end termination and said second end termination is L4 and a width of said respective first and second end terminations measured on a side surface of said capacitor element is L5, said L1, L2, L3, L4 and L5 satisfy the inequalities (4), (5), (6), (7) and (8) as defined below, respectively;

$$3.0 \text{ mm} \leq L1 \leq 5.5 \text{ mm} \quad (4)$$
$$0.5 \text{ mm} \leq L2 \leq 2.5 \text{ mm} \quad (5)$$
$$1.5 \text{ mm} \leq L3 \leq 3.5 \text{ mm} \quad (6)$$
$$L4 \geq 1.5 \text{ mm} \quad (7)$$
$$L5 \geq 0.5 \text{ mm} \quad (8)$$

wherein a capacitance (C) of said capacitor element and a DC breakdown voltage (BDV) satisfy the inequalities (9) and (10) as defined below, respectively;

$$4 \text{ pF} \leq C \leq 4700 \text{ pF} \quad (9)$$
$$BDV \geq 4.5 \text{ KV} \quad (10)$$

wherein a minimum spacing between said first mounting section and said second mounting section ranges from 3.0 mm to 6.0 mm; and wherein said capacitor element is a multi-layer capacitor.

35. An electronic component comprising:

(a) a plurality of capacitor elements, said plurality of capacitor elements each being shaped substantially like a rectangular prism, said plurality of capacitor elements each having a pair of end terminations, said pair of end terminations comprise a first end termination disposed on a first end of each of said plurality of capacitor elements and a second termination disposed on a second end of each of said plurality of capacitor elements;

(b) a first lead terminal connected to said first end terminations, said first lead terminal having a first junction section where a connection is made with said first end terminations;

(c) a second lead terminal connected to said second end terminations, said second lead terminal having a second junction section where a connection is made with said second end terminations; and (d) an exterior packaging material encapsulating said plurality of capacitor elements, first end terminations, second end terminations, first junction section and second junction section, said exterior packaging material is substantially shaped like a rectangular prism, wherein said first lead terminal has a first mounting section that is exposed from said exterior packaging material and said second lead terminal has a second mounting section that is exposed from said exterior packaging material;

wherein when said exterior packaging material measures M1 in length, M2 in height and M3 in width, said M1, M2 and M3 satisfy the inequalities (1), (2) and (3) as defined below, respectively;

$$4.5 \text{ mm} \leq M1 \leq 7.5 \text{ mm} \quad (1)$$
$$1.0 \text{ mm} \leq M2 \leq 3.5 \text{ mm} \quad (2)$$
$$2.0 \text{ mm} \leq M3 \leq 7.0 \text{ mm} \quad (3)$$

wherein when said plurality of capacitor elements measures L1 in length, L2 in height and L3 in width, a spacing between said first end terminations and said second end terminations is L4 and a width of said respective first and second end terminations measured on a side surface of said plurality of capacitor elements is L5, said L1, L2, L3, L4 and L5 satisfy the inequalities (4), (5), (6), (7) and (8) as defined below, respectively;

$$3.0 \text{ mm} \leq L1 \leq 5.5 \text{ mm} \quad (4)$$
$$0.5 \text{ mm} \leq L2 \leq 2.5 \text{ mm} \quad (5)$$
$$1.5 \text{ mm} \leq L3 \leq 3.5 \text{ mm} \quad (6)$$
$$L4 \geq 1.5 \text{ mm} \quad (7)$$
$$L5 \geq 0.5 \text{ mm} \quad (8)$$

wherein a capacitance (C) of said capacitor element and a DC breakdown voltage (BVD) satisfy the inequalities (9) and (10) as defined below, respectively;

$$4 \text{ pF} \leq C \leq 4700 \text{ pF} \quad (9)$$
$$BDV \geq 4.5 \text{ KV} \quad (10)$$

wherein a minimum spacing between said first mounting section and said second mounting section ranges from 3.0 mm to 6.0 mm;

wherein each of said plurality of capacitor elements is a multi-layer capacitor; and wherein an area of said exterior packaging material, out of which said respective first and second lead terminals extend outside of said exterior packaging material, protrudes from other areas of said exterior packaging material and said respective first and second lead terminals extend out from said protruded area of said exterior packaging material.

36. The electronic component according to claim 35, wherein a minimum spacing between a surface of said exterior packaging material and a surface of said capacitor element is 0.1 mm or more.

37. The electronic component according to claim 35, wherein each respective capacitor element of said plurality of capacitor elements has at least a value of capacitance selected from (i) capacitance same with one another and (ii) capacitance different from one another.

38. An electronic component comprising:
  (a) a capacitor element, said capacitor element being shaped substantially like a rectangular prism, said capacitor element having a pair of end terminations, said pair of end terminations comprise a first end termination disposed on a first end of said capacitor element and a second termination disposed on a second end of said capacitor element;
  (b) a first lead terminal connected to said first end termination, said first lead terminal having a first junction section where a connection is made with said first end termination;
  (c) a second lead terminal connected to said second end termination, said second lead terminal having a second junction section where a connection is made with said second end termination;
  (d) other electronic elements; and
  (e) an exterior packaging material encapsulating said capacitor element, first end termination, second end termination, first junction section and second junction section said exterior packaging material is substantially shaped like a rectangular prism,
  wherein said first lead terminal has a first mounting section that is exposed from said exterior packaging material and said second lead terminal has a second mounting section that is exposed from said exterior packaging material;
  wherein when said exterior packaging material measures M1 in length, M2 in height and M3 in width, said M1, M2 and M3 satisfy the inequalities (1), (2) and (3) as defined below, respectively;

$$4.5 \text{ mm} \leq M1 \leq 7.5 \text{ mm} \quad (1)$$
$$1.0 \text{ mm} \leq M2 \leq 3.5 \text{ mm} \quad (2)$$
$$2.0 \text{ mm} \leq M3 \leq 7.0 \text{ mm} \quad (3)$$

wherein when said capacitor element measures L1 in length, L2 in height and L3 in width, a spacing between said first end termination and said second end termination is L4 and a width of said respective first and second end terminations measured on a side surface of said capacitor element is L5, said L1, L2, L3, L4 and L5 satisfy the inequalities (4), (5), (6), (7) and (8) as defined below, respectively;

$$3.0 \text{ mm} \leq L1 \leq 5.5 \text{ mm} \quad (4)$$
$$0.5 \text{ mm} \leq L2 \leq 2.5 \text{ mm} \quad (5)$$
$$1.5 \text{ mm} \leq L3 \leq 3.5 \text{ mm} \quad (6)$$
$$L4 \geq 1.5 \text{ mm} \quad (7)$$
$$L5 \geq 0.5 \text{ mm} \quad (8).$$

wherein a capacitance (C) of said capacitor element and a DC breakdown voltage (BDV) satisfy the inequalities (9) and (10) as defined below, respectively;

$$4 \text{ pF} \leq C \leq 4700 \text{ pF} \quad (9)$$
$$BDV \geq 4.5 \text{ KV} \quad (10)$$

wherein a minimum spacing between said first mounting section and said second mounting section ranges from 3.0 mm to 6.0 mm;

wherein said capacitor element is a multi-layer capacitor; and wherein an area of said exterior packaging material, out of which said respective first and second lead terminals extend outside of said exterior packaging material, protrudes from other areas of said exterior packaging material and said respective first and second lead terminals extend out from said protruded area of said exterior packaging material.

39. The electronic component according to claim 38, wherein a minimum spacing between a surface of said exterior packaging material and a surface of said capacitor element is 0.1 mm or more.

40. The electronic component according to claim 38, wherein said other electronic elements comprise at least one out of an inductance element and a resistance element.

* * * * *